(12) United States Patent
Özbek et al.

(10) Patent No.: US 7,584,057 B2
(45) Date of Patent: Sep. 1, 2009

(54) SEISMIC ACQUISITION AND FILTERING (75) Inventors: Ali Özbek, Milton (GB); Leila Hoteit, London (GB)

(73) Assignee: WesternGeco, LLC, Houston, TX (US)

( * ) Notice: Subject to any disclaimer, the term of this patent is extended or adjusted under 35 U.S.C. 154(b) by 41 days.

(21) Appl. No.: 10/585,291

(22) PCT Filed: Dec. 23, 2004

(86) PCT No.: PCT/GB2004/005427

§ 371 (c)(1),
(2), (4) Date: May 17, 2007

(87) PCT Pub. No.: WO2005/066661

PCT Pub. Date: Jul. 21, 2005

(65) Prior Publication Data
US 2008/0033655 A1    Feb. 7, 2008

(30) Foreign Application Priority Data

Jan. 9, 2004  (GB) .................................. 0400409.9

(51) Int. Cl.
*G01V 1/36* (2006.01)
(52) U.S. Cl. ....................................................... 702/17
(58) Field of Classification Search .................. 702/14, 702/17, 189; 367/36, 45, 46

See application file for complete search history.

(56) References Cited

U.S. PATENT DOCUMENTS

| 5,771,203 | A | | 6/1998 | Soubaras |
| 5,781,503 | A | * | 7/1998 | Kim ............................. 367/45 |
| 6,668,228 | B1 | * | 12/2003 | Ozbek et al. .................. 702/17 |
| 2002/0183931 | A1 | | 12/2002 | Anno |
| 2003/0078734 | A1 | * | 4/2003 | Ozbek .......................... 702/14 |

OTHER PUBLICATIONS

çetin et al An iterative procedure for designing two dimensional FIR filters IEE Int. Symp. Circuits Systems, 1987, pp. 1044-1047.
çetin et al Equiripple FIR filter design by the FFT algorithm IEEE Signal Processing Magazine, vol. 14, No. 2, 1997, pp. 60-64.
Dudgeon et al Discrete Fourier transformas for general periodically sampled signals Multidimensional digital signal processing, Section 2.4.3, Prentice-Hall, 1984, pp. 96-100.
Özbek et al 3-D filter design on a hexagonal grid with applications to point-receiver land acquisition SEG International Exposition and 74th Annual Meeting, Denver, Colorado, Oct. 10-15, 2004, pp. 1965-1968.

* cited by examiner

*Primary Examiner*—Bryan Bui
(74) *Attorney, Agent, or Firm*—James McAleenan; Jody Lynn DeStefanis (57) ABSTRACT

An iterative process is described for obtaining a finite impulse filter to remove noise from seismic data through an iterative process with constraints on the filter applied in both, the original space-time and the transform frequency wave number at each iteration step.

13 Claims, 7 Drawing Sheets

SEISMIC ACQUISITION AND FILTERING

The present invention generally relates to apparatus and methods for acquiring seismic signal and filtering such data. More particularly, it is directed to a method of acquiring and processing single sensor recordings, specifically to derive filters to attenuate the noise in the thus acquired seismic data.

BACKGROUND OF THE INVENTION

Seismic data is collected to analyze the subsurface of the Earth, and is particularly collected in connection with hydrocarbon exploration and production activities. Seismic data for analyzing subsurface structures may be collected on land or over water. In order to obtain seismic data, an acoustic source is used which typically consists of explosives or a seismic vibrator on land or an impulse of compressed air at sea. The seismic signals reflected by the various geologic layers beneath the surface of the Earth are known as traces and are sensed by a large number, typically hundreds or thousands, of sensors such as geophones on land and hydrophones at sea. The reflected signals are recorded and the results are analyzed to derive an indication of the geology in the subsurface. Such indications may then be used to assess the likelihood and location of potential hydrocarbon deposits.

Seismic surveys are generally conducted using one or more receiver lines having a plurality of receiver station locations spaced evenly along their lengths. In a two dimensional (2D) survey, a single receiver line is used and the acoustic source is typically positioned at various points in-line with the receiver line. In a three dimensional survey, a plurality of parallel receiver lines are typically used and the acoustic source is generally positioned at various points offset from the receiver lines. While a 2D seismic survey can only create a cross-sectional representation of the subsurface, a 3D seismic survey can be used to develop a three dimensional representation of the subsurface.

Seismic data are subject to a wide variety of noise related problems that can and do limit its usefulness. Broadly speaking, noise found in seismic traces is either incoherent or coherent. Incoherent ambient noise, or uncorrelated "white" noise, is ubiquitous and is generally greatly attenuated through the simple expedient of stacking, although extremely large individual data values ("spikes") and "bad" traces often need special attention. Coherent, or correlated, noise on the other hand cannot usually be so readily eliminated. Some common examples of coherent noise include multiple reflections, ground roll, air waves, guided waves, sideswipe, cable noise and 60 hertz power line noise. Among the many known approaches to attenuating noise, there are space-time based or transform based methods. Space-time based methods operate on the time series of the acquired data. Transform based methods operate on data transformed from the space-time domain into another domain using a suitable transformation. The most popular of the 2-D transform methods is the 2-D Fourier transform (or "f-k" transform). Seismic data containing noise are transformed to the alternative domain where noise events are more compactly represented. If the noise energy can be located and isolated in the transform domain, it is removed from the transformed data by filtering or muting, i.e. by setting the values in the region corresponding to the noise energy equal to zero or some other minimal value. Finally, the transformed data, without the noise energy, are then inverse transformed to return them to the time and offset (i.e., untransformed or "x-t") domain.

In conventional seismic data acquisition systems data are inherently filtered through use of "hard-wired" (electrically connected) groups of sensors. A group or receiver array delivers a single output trace (the normalized sum or arithmetic average of the output of all individual sensors of the group) at the particular receiver station location about which the sensors are placed. The single trace is the normalized sum or arithmetic average of the output of all individual sensors making up the group. Without further processing, such a two-dimensional group has a spectral response that can be approximated by a frequency- independent 2D sinc function in the wavenumber or kx-ky domain.

More recently, however, seismic surveys have been performed using single or point receiver arrays. Such surveys offer the potential of recording the output of individual sensors or receivers and the inherent filtering effect of the hard-wired group can be replaced by filters that are better adapted to the nature of seismic noise and preserve more of the seismic reflection signals.

It is therefore an object of the present invention to provide methods for processing seismic data, particularly methods for designing and applying filters for such data.

SUMMARY OF THE INVENTION

The invention includes a method of determing a digital filter for seismic signals comprising the steps of: defining constraints representing a filter for preserving signals representing reflection and/or refractions from sub-surface structure and suppressing noise signals in seismic signals; and using an iterative process with each iteration comprising: transforming a filter obtained from a previous iteration into a transform domain; applying in said transform domain first constraints; inverse transforming the filter with the applied constraints into a sample domain; and applying in said sample domain second constraints to obtain an iterated filter.

The term sample domain and transform domain are arbitrary in the sense that both domain are representations of the seimic signals using a different set of coordinates. The transform describes the change from one domain to the other and the inverse transform describes the reverse direction. Preferably the transform is between the wavenumber or frequency-wavenumber domain and and the spatial or temporal-spatial domain. This transform can be performed by thewell-known Fourier transform.

In a preferred embodiment the filter is constrained to a predefined tolerance in one domain and to a predefined response outside a finite region in the other. The predefined response is in most case very small or zero to suppress the signal outside the finite region.

The method is preferable applied using a non-rectangular transform which can be described as staggered or hexagonal, even though the hexagonal case is only a special case of the general staggered transform used.

Application of this staggered transform yields superior results when applied to data acquired on a staggered grid. It is therefore another aspect of the invention to use groups of receivers or single sensor seismic receivers distributed to obtain seismic measurements on a staggered or hexagonal grid. A staggered grid can be characterised by having non-diagonal elements in the matrix that translates the grid points onto themselves. In a more practical definition a staggered grid can be seen as an array of points in which every second rows of of points are shifted with respect to the remaining rows or as two overlapping and shifted rectangular grids.

The filter of the present inventions are preferably is a zero-phase finite impulse response (FIR) filter. They have at least at least two dimensions, but are preferably full three-dimensional (3D) filters.

These and other aspects of the invention will be apparent from the following detailed description of non-limitative examples and drawings.

DETAILED DESCRIPTION

A filter in accordance with the present invention is designed to remove at least part of the noise from the data acquired through a seismic survey. The known noise characteristics and seismic signal spectrum depend on the various parameter such as source and receiver locations, the acoustic properties of near surface layers and many other parameters within or outside the control of an operator. Any such pre-established knowledge of the noise characteristics can be used to establish a set of filter parameters that when combined provide a description of the filter suitable to be used as an input to a data processing machine or computer.

The example of FIG. 1 shows the ideal wavenumber response of a 2-D filter. Two schematic perpendicular cross-sections are shown in FIG. 1A illustrating parameter for a functional description of the design in the wave number or (f-kx-ky) domain. FIG. 1B shows the f-kx cross-section for ky=0, FIG. 1C shows the middle panel shows the f-ky cross-section for kx=0, and FIG. 1D shows the kx-ky cross-section at f=10 Hz.

In the 2-D survey of this example, most of the reflection energy is expected to be incident in, or near the in-line plane, whereas most of the energy incident in the cross-line direction should be scattered ground-roll and other types of noise. The passband of the initial 2-D x-y filter is therefore designed with elliptical contours, with greater attenuation in the cross-line direction. The larger passband in the in-line direction is designed to preserve signal components with maximum wavenumber and frequency content.

The filter of FIG. 1 is characterized by three frequency bands separated by the frequencies fbreak1 and fbreak2. Within each frequency band there is defined a pass zone (the central zone), a transition zone and an outer reject or stop zone. The boundaries of the zone are marked by piecewise linear function defined through the slowness parameters s1 to s6.

Further parameters characterizing the filter of the example is the aspect ratio of the elliptical pass zone and the desired attenuation in the stop band and the width of the transition zone.

Other parameter define the dimensions (length, width) of the filter or the filter support for a finite impulse response filter (FIR) as used in this example.

Filters can be characterized by parameters others than those described above. But independent of the specific form of representation, it is always possible to define a representation of a desired filter in machine readable form.

Each of the parameters of such an ideal filter can be regarded as constraints in the time domain and in the frequency domain and the problem of designing a real filter is an approximation optimized with those constraints.

It is known that if the constraints define convex sets in the set of square summable sequences, then applying alternating orthogonal projections onto these would converge to the optimal solution. This is called the method of Alternating Projections onto Convex Sets (APOCS). The APOCS method has been used in various technical fields outside seismic processing. For details of the APOCS method reference is made to Cetin et al. (IEEE Signal Processing Magazine, vol. 14 (1997), pp. 60-64 or Proc. Int. Symp. Circuits and Systems, 1987, pp. 1044-1047) who adapted the APOCS method to the design of zero-phase 2-D finite impulse response (FIR) filters.

In the APOCS method the filter design problem is formulated to alternately satisfy the frequency domain constraints on the magnitude response bounds and sample (space and/or time) domain constraints on the impulse response support. The algorithm is iterative and each iteration requires two 2-D FFT computations. Cetin et al. (see above) have shown that if convergence is achieved, this approach results in filters with approximately equiripple response.

It can be proven that the APOCS method is globally convergent under certain conditions. If the constraints in the sample and spectral domains define convex sets in the set of square summable sequences, then the imposition of the constraints in the sample and spectral domains are the orthogonal projections onto these sets, and if the sets intersect, the iterates converge to a member in the intersection set. Furthermore, if there is just one sequence satisfying both conditions, then this sequence is the equiripple solution of the filter design problem. Consequently, the iterations converge to the equiripple filter.

Generalizing to the design of a 3-D filter, the filter is to be zero-phase, and its spectral response in the f-kx-ky domain, $H(f,k_x,k_y)$ to be within given tolerance ranges:

$$H_{id}(f,k_x,k_y) - E_d(f,k_x,k_y) \leq H_{id}(f,k_x,k_y) \leq H_{id}(f,k_x,k_y) + E_d(f,k_x,k_y), \qquad [1]$$

where $H_{id}(f,k_x,k_y)$ is the ideal filter response, and $E_d(f,k_x,k_y)$ is the tolerance, or the desired maximum ripple level, which may take different values in different passbands and stopbands. The ideal response is defined as $$H_{id}(f, k_x, k_y) = \begin{cases} 1, & \text{if } (f, k_x, k_y) \in F_P, \\ 0, & \text{if } (f, k_x, k_y) \in F_S, \end{cases} \qquad [2]$$

and the tolerances as $$E_d(f, k_x, k_y) = \begin{cases} \delta_P, & \text{if } (f, k_x, k_y) \in F_P, \\ \delta_S, & \text{if } (f, k_x, k_y) \in F_S, \end{cases} \qquad [3]$$

where $F_p$ and $F_s$ are the pass and stop bands, and $\delta_P$ and $\delta_S$ are the corresponding tolerances, respectively.

In the t-x-y domain, the filter has a finite-extent support, I, which is a symmetric region around the origin in order to have a zero-phase response. The time-space domain constraint requires that the filter coefficients are zero outside the region I.

The iterative method is initialized with an arbitrary finite-extent, real 3-D sequence that is symmetric around the origin in order to have a zero-phase response. The time/space domain constraint requires that the filter-coefficients must be equal to zero outside the region I. As an initial estimate, the inverse Fourier Transform ($F^{-1}$) of the ideal frequency response is used:

$$h_{id}(t,x,y) = F^{-1}\{H_{id}(f,k_x,k_y)\} \quad [4]$$

with $$h_0(t, x, y) = \begin{cases} h_{id}(t, x, y), & \text{if } (t, x, y) \in I, \\ 0, & \text{otherwise.} \end{cases} \quad [5]$$

Figure 1A:
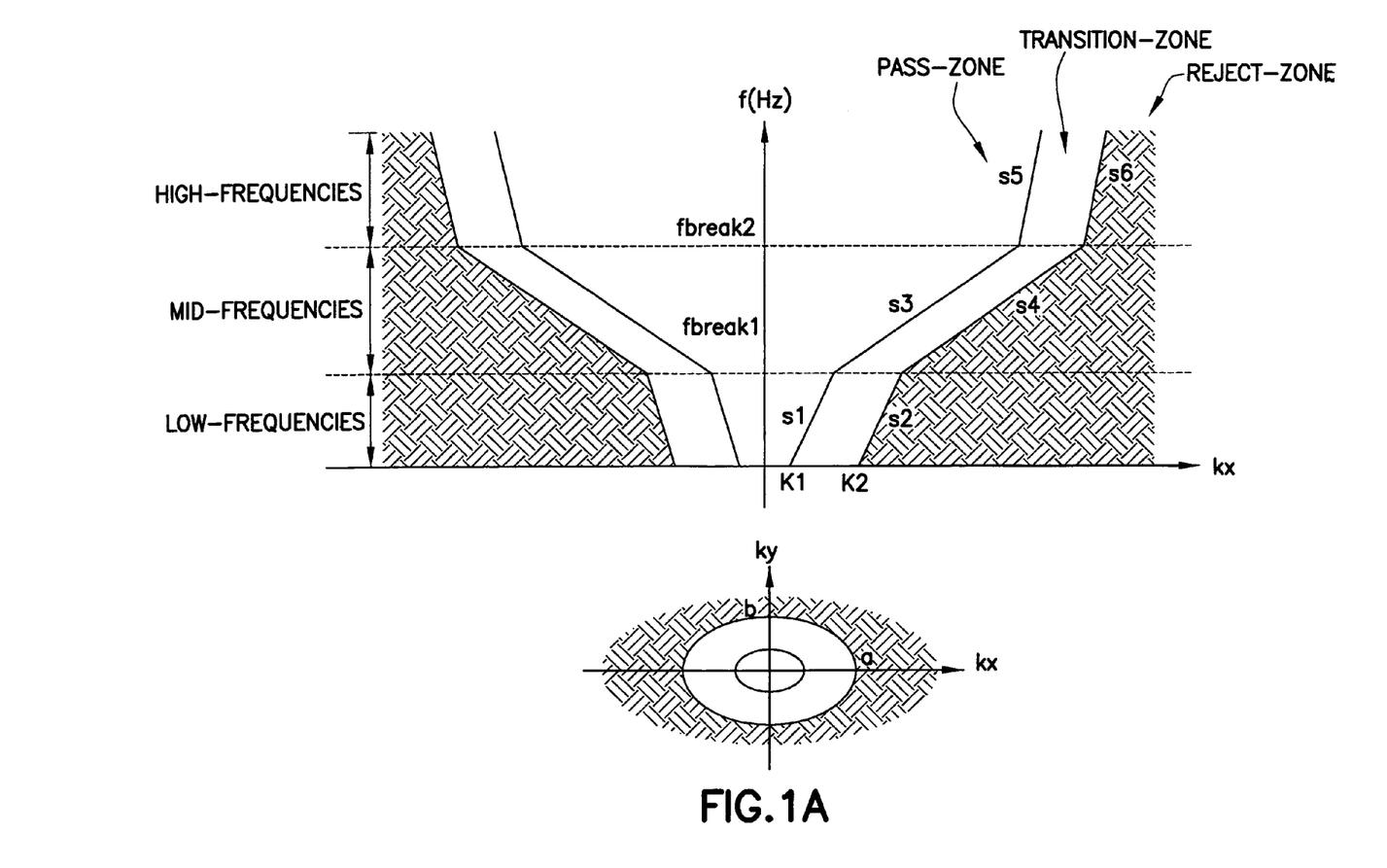
FIGS. 1A-D show a desired ideal wave number (kx-ky) response of a 2D x-y filter in three different cross-sections.
Figure 1B:
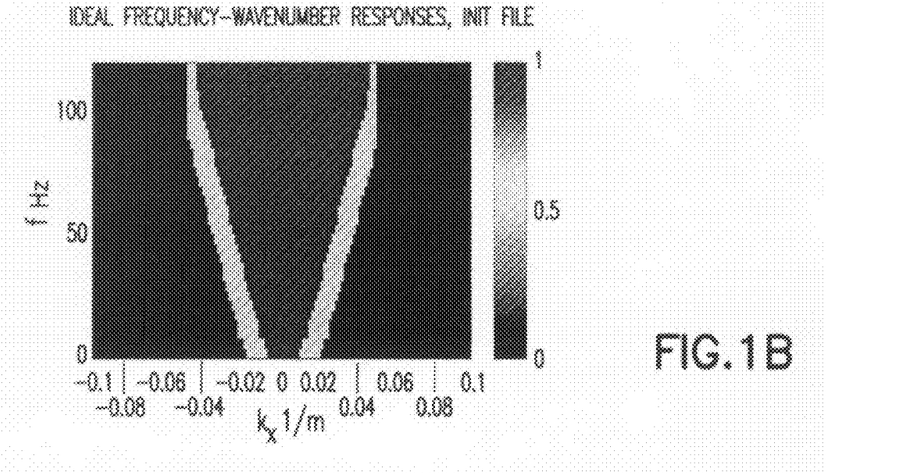
Figure 1C:
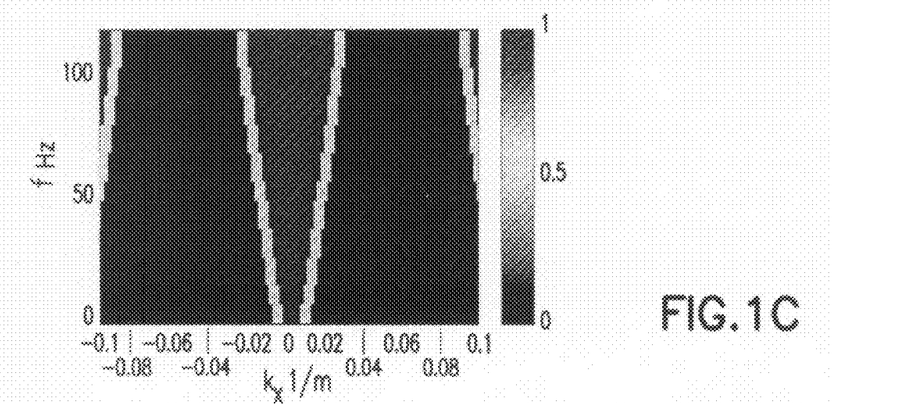
Figure 1D:
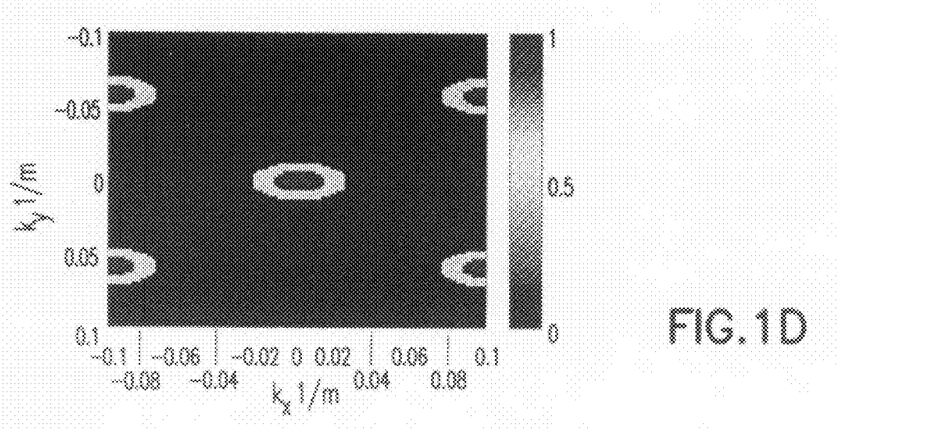
Figure 2:
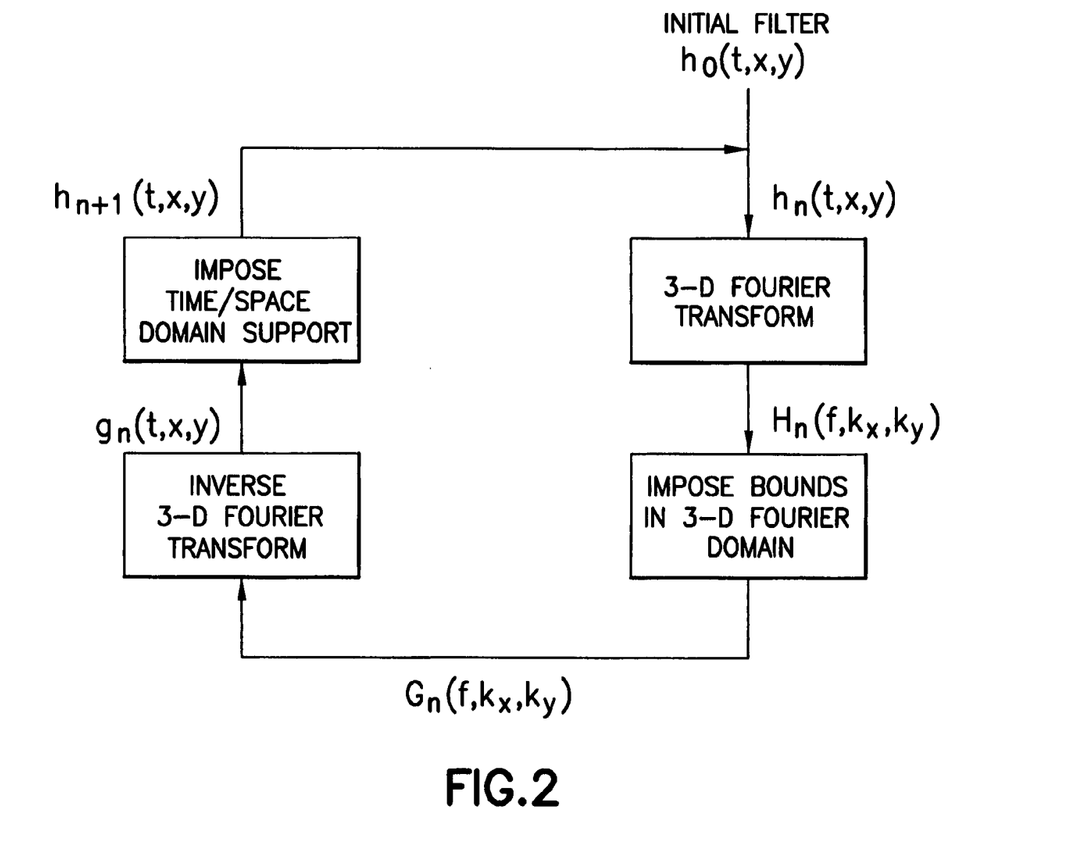
FIG. 2 illustrates steps to design a filter in accordance with an example of the invention.

FIG. 2 illustrated the iterative process beginning with the selection of an initial time domain response $h_{id}$.

At each iteration of the algorithm, the time/space and frequency/wavenumber domain constraints are successively imposed onto the current iterate. The n-th iteration consists of the following steps:

Compute the 3D Fourier Transform of the n-th iterate $h_n$(t, x,y) by a 3D FFT algorithm to obtain $H_n$(f,kx,ky).

Impose the frequency/wavenumber domain constraints as:

$$G_n(f, k_x, k_y) = \begin{cases} H_{id}(f, k_x, k_y) + E_d(f, k_x, k_y), \\ \text{if } H_n(f, k_x, k_y) > H_{id}(f, k_x, k_y) + E_d(f, k_x, k_y), \\ H_{id}(f, k_x, k_y) - E_d(f, k_x, k_y), \\ \text{if } H_n(f, k_x, k_y) < H_{id}(f, k_x, k_y) + E_d(f, k_x, k_y), \\ H_n(f, k_x, k_y), \text{ otherwise.} \end{cases} \quad [6]$$

Compute the 3-D inverse Fourier Transform of $G_n$(f,kx,ky) to obtain $g_n$(t,x,y).

equal $g_n$(t,x,y) to zero outside the region I to obtain $h_{n+1}$(t, x,y) as $$h_{n+1}(t, x, y) = \begin{cases} g_n(t, x, y), & \text{if } (t, x, y) \in I, \\ 0, & \text{otherwise.} \end{cases} \quad [7]$$

If the mean-squared error between the iterates $h_n$(t,x,y) and $h_{n+1}$(t,x,y) is less than a predefined threshold, then exit.

These steps are performed using a standard numerical programme such as Matlab(™) and the routines embedded therein.

The method outlined above can be directly applied to seismic data acquired on a rectangular grid by using a 2D rectangular fast Fourier transformation (FFT) that samples the data at rectangularly distributed points.

However, the advent of single sensor recording makes it more feasible to acquire seismic data on a staggered layout of receivers. It is known that circularly bandlimited signals require 13 percent less samples to achieve the same spectral resolution when sampled on a staggered grid than being sampled on a rectangular grid. Since seismic signals and noise can be assumed to be circularly bandlimited in the wavenumber space, hexagonal sampling is more efficient than rectangular sampling potentially reducing the number of receivers in a survey by 13 percent.

It is therefore advantageous to adapt the present method to accommodate surveys performed using a hexagonal distribution of receivers or groups of receivers.

It is feasible to apply the above method to data acquired on a staggered or hexagonal grid by using the following steps:
spatial oversampling:
performance of a rectangular FFT;
imposing spectral constraints in the wavenumber domain;
using a rectangular inverse Fourier transform to revert to the time domain; and
imposing zeros on points that do not correspond to receiver locations.

Figure 3:
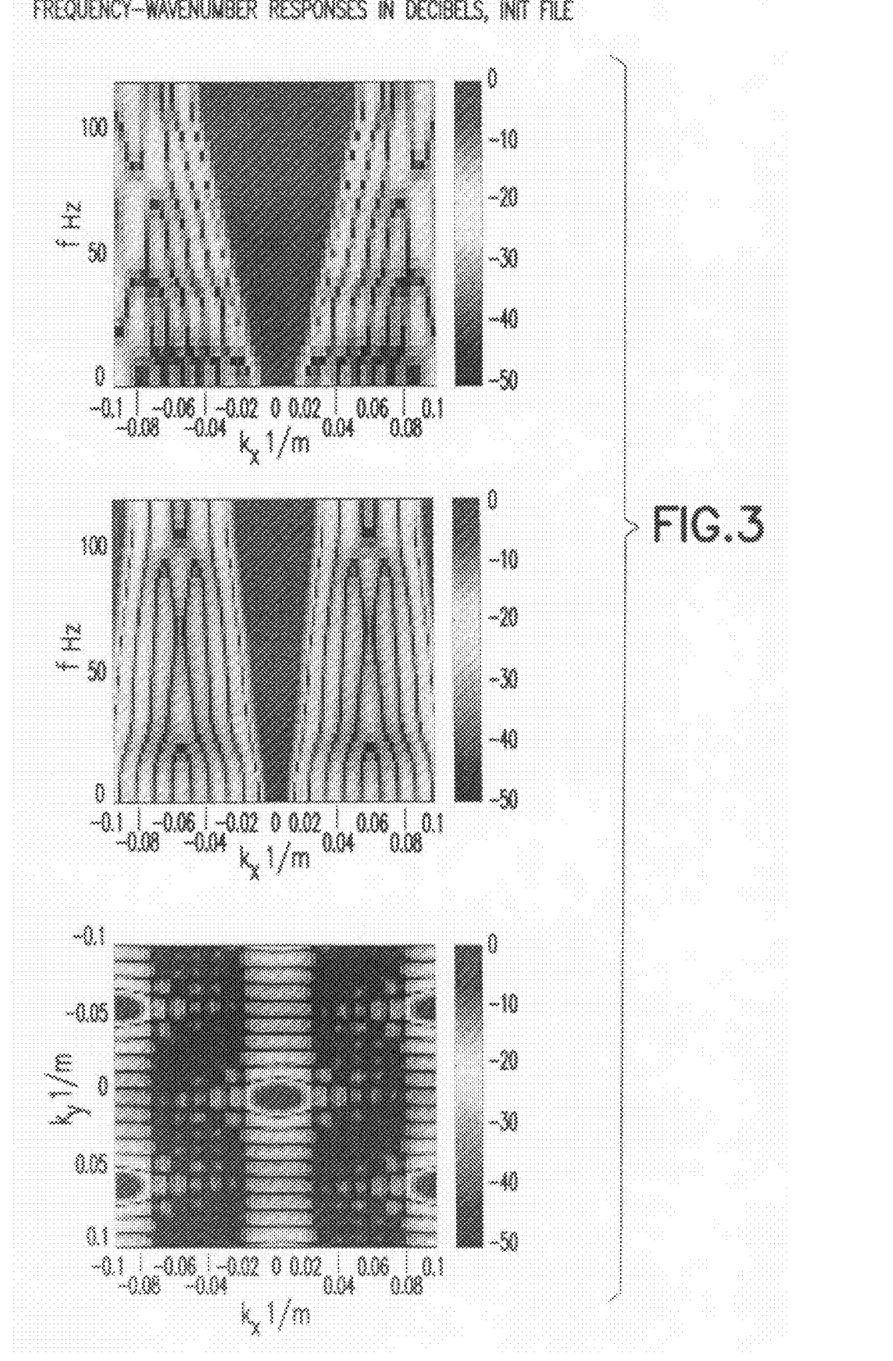
FIG. 3 shows the wavenumber (kx-ky) response of a 2D x-y filter designed in accordance to the method of FIG. 2 using a rectangular discrete fast Fourier transform.

FIG. 3 shows the resulting response of a 2D filter with dB contour levels for a hexagonal receiver grid using a rectangular FFT as outlined in the previous paragraph. As in FIG. 1, the top panel shows the f-kx cross-section for ky=0, the middle panel shows the f-ky cross-section for kx=0, and the bottom panel shows the kx-ky cross-section at f=10 Hz. Comparison with FIG. 1 shows that signals from outside the desired region (sidelobes) leak into the filtered data.

This is a consequence of a mismatch between the true receiver locations which for this example were placed on a hexagonal grid and the rectangular DFT used for the iterative process. The method introduces holes into the sample domain, which is no longer convex. Convergence is then no longer guaranteed and the above filter design method is not expected to give optimum results.

It was found that the performance of the filter design method can be significantly improved by using a Fourier transform with hexagonal sampling in the space (x-y) domain when the data is acquired on a hexagonal grid.

A discrete Fourier transform (DFT) that relates a hexagonal sampled signal to hexagonal sample of its Fourier transform is known as such and is given for example by $$X(k_1, k_2) = \sum_{n_1=0}^{3N-1} \sum_{n_2=0}^{N-1} x(n_1, n_2) \exp\left[-j\frac{2\pi}{3N}\{(2n_1 - n_2)k_1 + 3n_2k_2\}\right] \quad [8]$$

For this and further details of the hexagonal DFT reference can be made for example to R. M. Mersereau and D. E Dudgeon in "Multidimensional Digital Signal Processing", Prentice-Hall 1984, 97-100.

Figure 4:
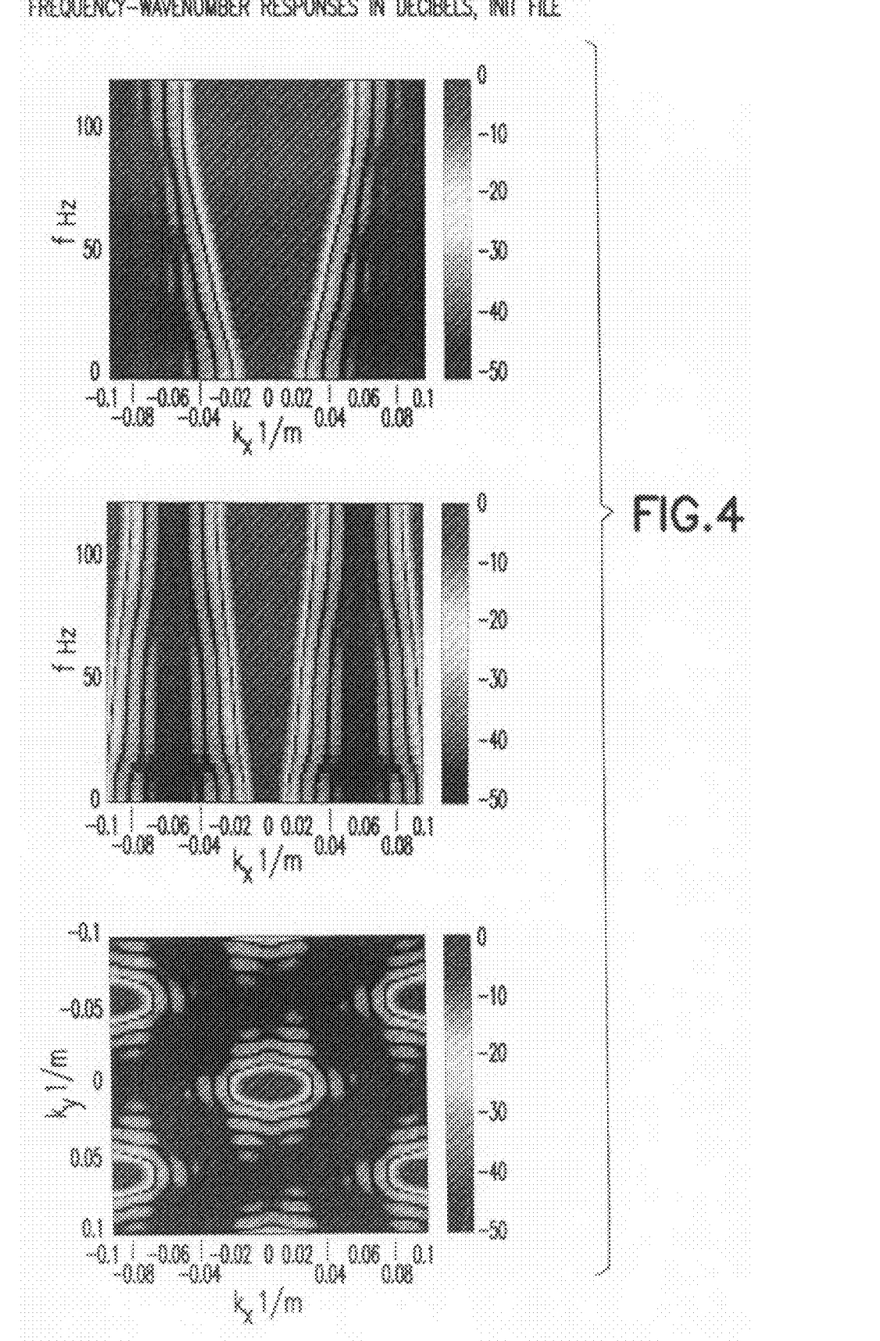
FIG. 4 shows the wavenumber (kx-ky) response of a 2D x-y filter designed in accordance to the method of FIG. 2 using a hexagonal discrete fast Fourier transform.

FIG. 4 shows the response resulting from the use of a hexagonal DTF of the 2D filter with dB contour levels. As in FIG. 1, the top panel shows the f-kx cross-section for ky=0, the middle panel shows the f-ky cross-section for kx=0, and the bottom panel shows the kx-ky cross-section at f=10 Hz. Comparison with FIG. 1 shows a very good match between the desired and the resulting responses, and the sidelobe levels of the stop band are less than 35 dB compared to the higher sidelobes apparent in FIG. 3.

It was found that the filter design results in improved data processing, particularly when used on seismic data acquired through single sensor surveys. To illustrate the improvement the same data set was acquired using (a) conventional groups of receivers, (b) single sensors and (c) a very low density of single sensors. After filtering the data was further processed using a stacking procedure with differential move-out (DMO) correction.

Figure 5A:
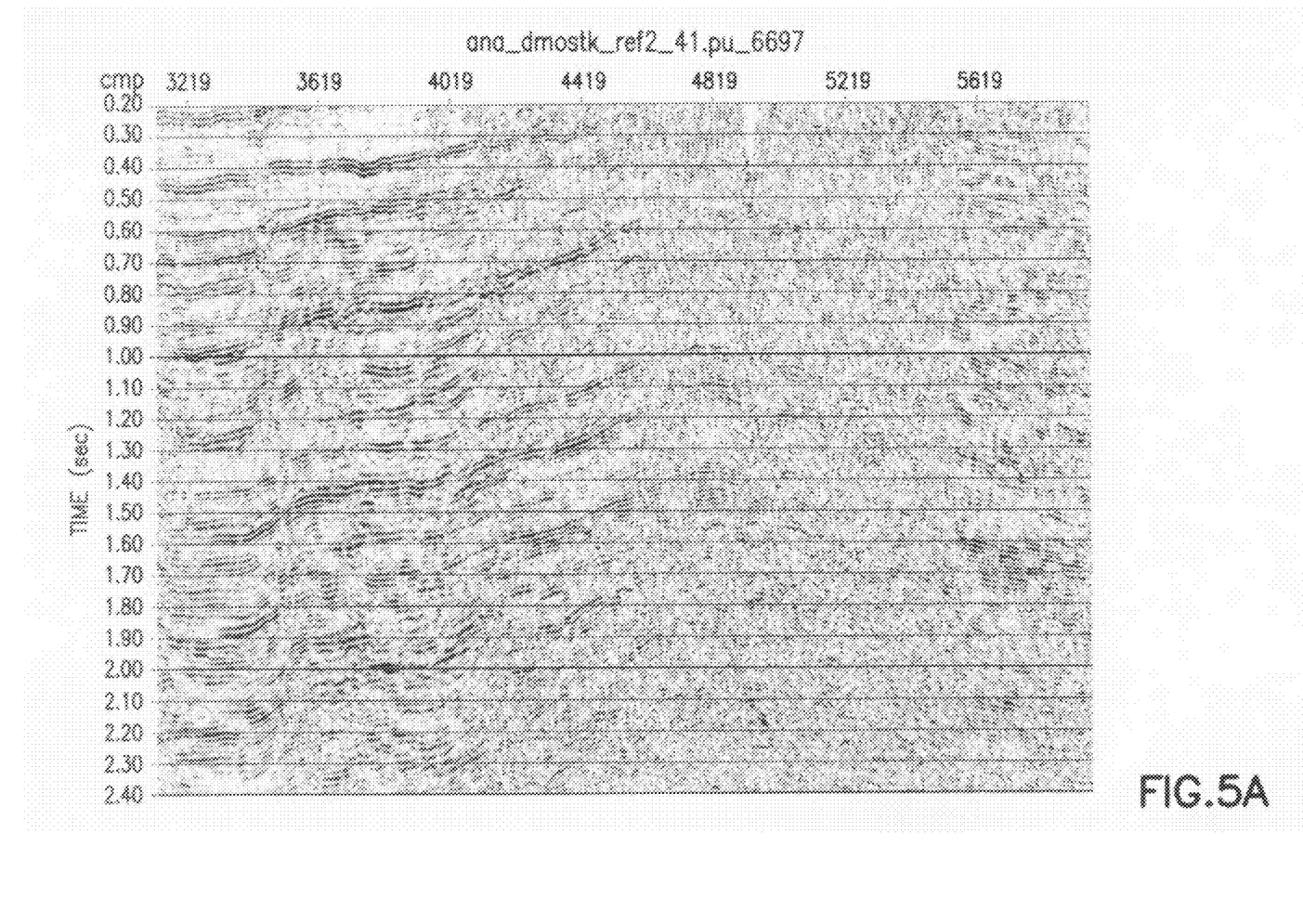
FIGS. 5A, B compare single receiver data sets obtained by processing in accordance with an example of the present invention (FIG. 5B) with a data set obtained with conventional hard-wired groups and conventional noise filtering (FIG. 5A) after differential moveout (DMO) stacking.
Figure 5B:
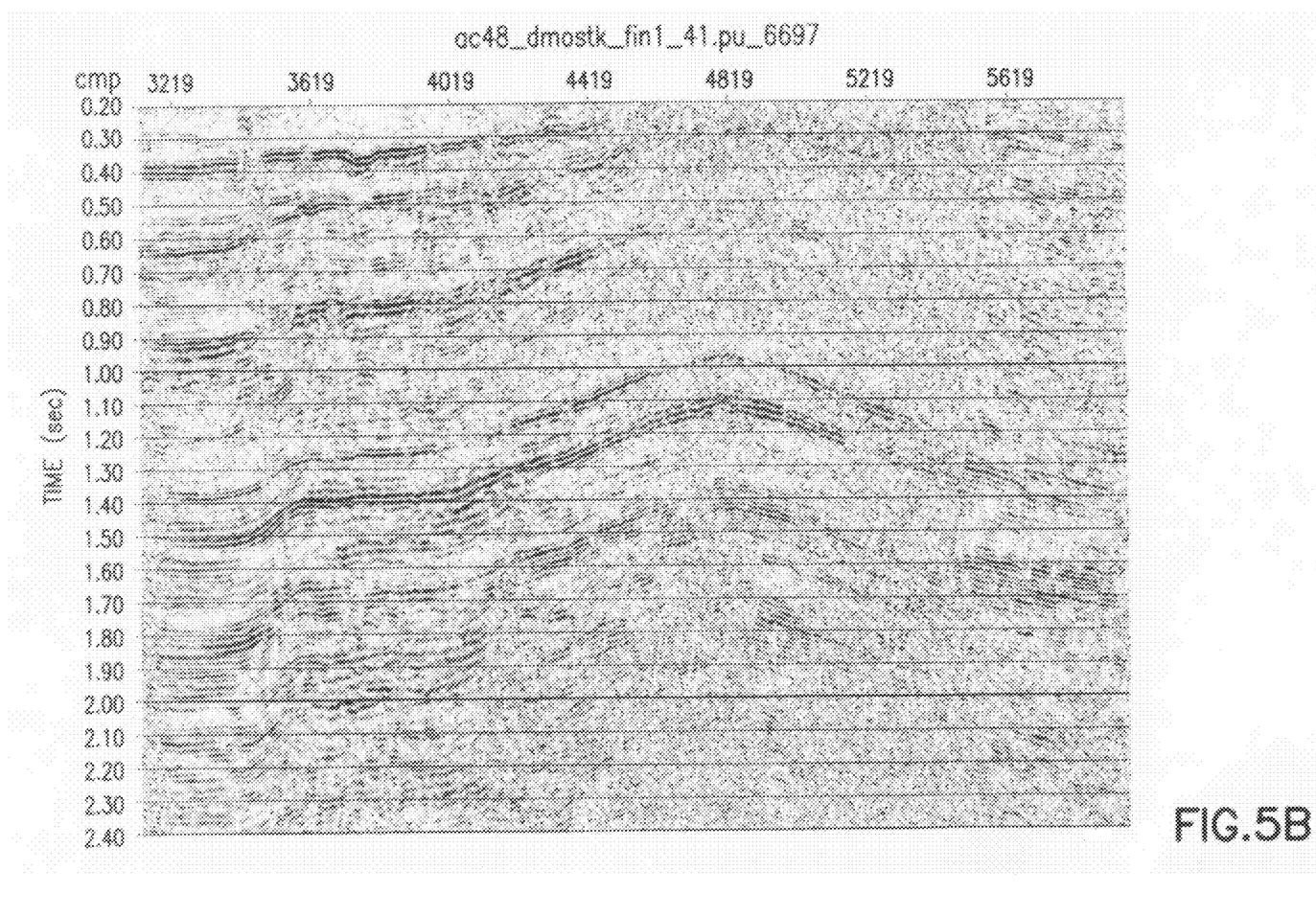

FIG. 5A shows the DMO stack obtained using conventional filtering methods on signals from analogue groups of 72 receivers per 30 metres, while FIG. 5B depicts the DMO stack obtained after processing by an adaptive pre-filter and an 2D filter designed through the iterative process described above (FIG. 2), using 36 receivers per 30 metres. Compared to the analogue result, FIG. 5B demonstrates considerable increase in S/N, especially for higher CMP's.

The invention claimed is:

1. A method of using a digital filter for seismic signals comprising the steps of:
   receiving seismic data;
   determining the digital filter by:
      defining constraints representing a filter for preserving signals representing reflection and/or refractions from sub-surface structure and suppressing noise signals in seismic signals; and
      using an iterative process with each iteration further comprising the steps of:
         transforming a filter obtained from a previous iteration into a transform domain;
         applying in said transform domain first constraints;
         inverse transforming the filter with the applied constraints into a sample domain; and
         applying in said sample domain second constraints to obtain an iterated filter; and
   using the digital filter to remove noise from the seismic data.

2. The method of claim 1 wherein each step of the iterative process includes the transform of the filter (coefficients) into the wavenumber or frequency-wavenumber domain and the inverse transform back into the spatial or temporal-spatial domain.

3. The method of claim 2 wherein in each step of the iterative process the filter is constrained to a predefined tolerance in the wavenumber or frequency-wavenumber domain.

4. The method of claim 2 wherein in each step of the iterative process the filter is constrained to a predefined response outside a finite region in the spatial or temporal-spatial domain.

5. The method of claim 2 wherein in each step of the iterative process the filter is constrained to a predefined response outside a finite region in the spatial or temporal-spatial domain and in each step of the iterative process the filter is constrained to a predefined tolerance in the wavenumber or frequency-wavenumber domain.

6. The method of claim 1 wherein the filter is obtained by applying alternating projection onto constraints defining convex sets of square summable sequences.

7. The method of claim 1 wherein the transform sampling/periodicity matrix of the transform in Cartesian coordinates is non-diagonal.

8. The method of claim 1, further comprising the step of distributing groups of receivers or single sensor seismic receivers so as to obtain the received seismic data on a staggered or hexagonal grid.

9. The method of claim 8 wherein the step of transforming comprises the use of a spatially staggered or hexagonal transformation.

10. The method of claim 9 wherein the step of transforming the signals comprises the use of a spatially staggered or hexagonal Fourier transformation.

11. The method of claim 1 wherein the filter is a zero-phase finite impulse response (FIR) filter.

12. The method of claim 1 wherein the filter has at least two dimensions.

13. The method of claim 1 wherein the filter is a 3D filter.

* * * * *